US005834573A

United States Patent [19]

Castner

[11] Patent Number: 5,834,573

[45] Date of Patent: Nov. 10, 1998

[54] SYNTHESIS OF TRANS-1,4-POLYBUTADIENE

[75] Inventor: Kenneth Floyd Castner, Uniontown, Ohio

[73] Assignee: The Goodyear Tire & Rubber Company, Akron, Ohio

[21] Appl. No.: 859,984

[22] Filed: May 21, 1997

[51] Int. Cl.[6] .............................. C08F 4/70; C08F 136/06

[52] U.S. Cl. ............................ 526/142; 526/88; 526/335; 526/907

[58] Field of Search .............................. 526/88, 142, 335, 526/907

[56] References Cited

U.S. PATENT DOCUMENTS 5,089,574 2/1992 Castner .................................. 526/142
5,448,002 9/1995 Castner .................................. 526/140

FOREIGN PATENT DOCUMENTS 67187 3/1997 Japan .

*Primary Examiner*—Fred Teskin
*Attorney, Agent, or Firm*—Alvin T Rockhill

[57] ABSTRACT

By utilizing the techniques of this invention, trans-1,4-polybutadiene can be synthesized continuously to a high level of conversion utilizing a low level of a highly active cobalt-based catalyst system. The trans-1,4-polybutadiene made with the cobalt-based catalyst system of this invention also typically has a molecular weight which is acceptable for use in tire applications without the need for employing a molecular weight regulator. It is also not typically necessary to utilize a gel inhibitor, such as carbon disulfide, in the polymerizations of this invention. Since a low level of residual cobalt is present in the trans-1,4-polybutadiene which is made utilizing the catalyst system of this invention, it is much more stable than trans-1,4-polybutadiene made with standard cobalt-based catalyst systems. This invention specifically relates to a process for synthesizing trans-1,4-polybutadiene by polymerizing 1,3-butadiene monomer in the presence of a catalyst system which is comprised of cobalt (III) acetylacetonate, an organoaluminum compound and a para-alkyl-substituted phenol, wherein the cobalt (III) acetylacetonate is mixed with the para-substituted phenol prior to the polymerization. Such polymerizations can be conducted on a batch or a continuous basis.

20 Claims, No Drawings

SYNTHESIS OF TRANS-1,4-POLYBUTADIENE

BACKGROUND OF THE INVENTION

By virtue of its high level of crystallinity, trans-1,4-polybutadiene (TPBD) is a thermoplastic resin. Because it contains many double bonds in its polymeric backbone, TPBD can be blended and cocured with rubber. TPBD is similar to syndiotactic-1,2-polybutadiene in this respect. Even though the trans-1,4-polybutadiene of this invention is a thermoplastic resin, it becomes elastomeric when cured alone or when cocured with one or more rubbers.

Good molecular weight control can normally be achieved by utilizing an anionic polymerization system to produce TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, such catalyst systems have not proven to be commercially successful.

TPBD is normally prepared utilizing transition metal catalysts or rare earth catalysts. The synthesis of TPBD with transition metal catalysts is described by J. Boor Jr., "Ziegler-Natta Catalysts and Polymerizations," Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Japanese Patent Application No. 67187-1967 discloses a catalyst system and technique for synthesizing TPBD consisting of 75 to 80 percent trans-1,4-structure and 20 to 25 percent 1,2-structure. The catalyst system described by this reference consists of a cobalt compound having a cobalt organic acid salt or organic ligand, an organoaluminum compound and phenol or naphthol. Gel formation is a serious problem which is frequently encountered when this three-component catalyst system is utilized in the synthesis of TPBD. Gelation is a particularly serious problem in continuous polymerizations. By utilizing the catalyst system and techniques of this invention, TPBD can be synthesized in a continuous process with only minimal amounts of gel formation.

U.S. Pat. No. 5,089,574 is based upon the finding that carbon disulfide will act as a gel inhibitor in conjunction with three component catalyst systems which contain an organocobalt compound, an organoaluminum compound and a para-alkyl-substituted phenol. U.S. Pat. No. 5,089,574 also indicates that conversions can be substantially improved by utilizing para-alkyl-substituted phenols which contain from about 12 to about 26 carbon atoms and which preferably contain from about 6 to about 20 carbon atoms.

U.S. Pat. No. 5,089,574 more specifically reveals a process for synthesizing trans-1,4-polybutadiene in a continuous process which comprises continuously charging 1,3-butadiene monomer, an organocobalt compound, an organoaluminum compound, a para-substituted phenol, carbon disulfide and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

The techniques described in U.S. Pat. No. 5,089,574 are very useful in improving conversions and reducing gel formation. However, its teachings do not describe a technique for controlling the molecular weight of the TPBD being synthesized. In many applications, it would be desirable for the TPBD produced to have a lower molecular weight. There is, accordingly, a need to control the molecular weight of the TPBD produced with such Ziegler-Natta catalyst systems.

U.S. Pat. No. 5,448,002 discloses that dialkyl sulfoxides, diaryl sulfoxides and dialkaryl sulfoxides act as molecular weight regulators when utilized in conjunction with cobalt-based catalyst systems in the polymerization of 1,3-butadiene monomer into TPBD. U.S. Pat. No. 5,448,002 reports that the molecular weight of the TPBD produced decreases with increasing levels of the dialkyl sulfoxide, diaryl sulfoxide or dialkaryl sulfoxide present as a molecular weight regulator.

U.S. Pat. No. 5,448,002 specifically discloses a process for the synthesis of trans-1,4-polybutadiene which comprises polymerizing 1,3-butadiene monomer under solution polymerization conditions in the presence of at least one sulfoxide compound selected from the group consisting of dialkyl sulfoxides, diaryl sulfoxides and dialkaryl sulfoxides as a molecular weight regulator and in the presence of a catalyst system which includes an organocobalt compound, an organoaluminum compound and a para-alkyl-substituted phenol.

The presence of residual cobalt in TPBD made with cobalt-based catalyst systems is not desirable. This is because the residual cobalt can lead to polymer instability during storage. This is a particular problem in cases where the TPBD is stored in a "hot-house" prior to usage which is a standard procedure in many industries, such as the tire industry. In any case, higher levels of residual cobalt in the TPBD lead to worse problems with polymer instability. For this reason, it would be highly desirable to reduce the level of cobalt needed in catalyst systems which are used in the synthesis of TPBD. Reducing the level of cobalt needed is, of course, also desirable from a cost standpoint since cobalt compounds are relatively expensive.

Unfortunately, carbon disulfide is typically required as a gel-reducing agent in the synthesis of TPBD with cobalt-based catalyst systems. This is particularly true in the case of continuous polymerization systems. However, the presence of carbon disulfide in such systems reduces the level of catalyst activity and generally makes it necessary to increase the level of cobalt in the catalyst system. Thus, in cases where carbon disulfide is required for gel control, the level of cobalt needed is further increased.

SUMMARY OF THE INVENTION

By utilizing the techniques of this invention, trans-1,4-polybutadiene having a trans-isomer content within the range of about 82 percent to about 87 percent can be synthesized continuously to a high level of conversion utilizing a low level of a highly active cobalt-based catalyst system. The trans-1,4-polybutadiene made with the cobalt-based catalyst system of this invention also typically has a molecular weight which is acceptable for use in tire applications without the need for employing a molecular weight regulator. More specifically, the TPBD made utilizing the catalyst system of this invention typically has a dilute solution viscosity which is within the range of about 1.4 to about 2.4.

It is not typically necessary to utilize a gel inhibitor, such as carbon disulfide, in the polymerizations of this invention. This is because the TPBD made with the catalyst system of this invention produces an essentially gel-free polymer without the need for a gel inhibitor. Since a low level of residual cobalt is present in the trans-1,4-polybutadiene which is made utilizing the catalyst system of this invention, it is much more stable than trans-1,4-polybutadiene made with standard cobalt-based catalyst systems.

The present invention more specifically reveals a process for synthesizing trans-1,4-polybutadiene by polymerizing 1,3-butadiene monomer in the presence of a catalyst system which is comprised of cobalt (III) acetylacetonate, an organoaluminum compound and a para-alkyl-substituted phenol, wherein the cobalt (III) acetylacetonate is mixed with the para-alkyl-substituted phenol prior to the polymerization.

The subject invention also reveals a process for synthesizing trans-1,4-polybutadiene in a continuous process which comprises continuously charging 1,3-butadiene monomer, cobalt (III) acetylacetonate, an organoaluminum compound, a para-alkyl-substituted phenol and an organic solvent into a reaction zone, wherein the cobalt (III) acetylacetonate is mixed with the para-alkyl-substituted phenol prior to being charged into the reaction zone; allowing the 1,3-butadiene monomer to polymerize in said reaction zone to form the trans-1,4-polybutadiene; and continuously withdrawing the trans-1,4-polybutadiene from said reaction zone. In practicing the process of this invention, it is preferred for the molar ratio of the para-substituted phenol to the cobalt (III) acetylacetonate to be within the range of about 12:1 to about 16:1 and for the molar ratio of the organoaluminum compound to the cobalt (III) acetylacetonate to be within the range of about 16:1 to about 24:1.

DETAILED DESCRIPTION OF THE INVENTION

The polymerizations of the present invention will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent 1,3-butadiene monomer in the polymerization medium. Such polymerization media are, of course, comprised of the organic solvent and 1,3-butadiene monomer. In most cases, it will be preferred for the polymerization medium to contain from 10 to 25 weight percent monomer. It is generally more preferred for the polymerization medium to contain 15 to 20 weight percent 1,3-butadiene monomer.

The microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84 percent are typical. In cases where the polymerization medium contains about 30 weight percent monomer, TPBD having a trans content of only about 68 percent is generally produced.

Such polymerizations can be carried out utilizing batch, semi-continuous or continuous techniques. In a continuous process, additional 1,3-butadiene monomer, catalyst and solvent are continuously added to the reaction zone (reaction vessel). The polymerization temperature utilized will typically be within the range of about 20° C. to about 125° C. It is normally preferred for the polymerization medium to be maintained at a temperature which is within the range of about 65° C. to about 95° C. throughout the polymerization. It is typically most preferred for the polymerization temperature to be within the range of about 70° C. to about 90° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. In a continuous two-reactor system, the residence time in the first reactor will typically be from about 0.5 hours to about 1 hour with the residence time in the second reactor being about 1 hour to about 2 hours. In commercial operations, conversions in excess of about 80 percent will normally be attained. The polymerization can then be terminated using a standard procedure.

The organoaluminum compounds that can be utilized typically have the structural formula:

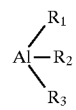

in which $R_1$ is selected from the group consisting of alkyl groups (including cycloalkyl), aryl groups, alkaryl groups, arylalkyl groups, alkoxy groups and hydrogen; $R_2$ and $R_3$ being selected from the group consisting of alkyl groups (including cycloalkyl), aryl groups, alkaryl groups and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

Halogens, such as fluorine, chlorine, bromine and iodine, and halogen containing compounds have been found to be poisons and are detrimental to the polymerizations of this invention. The polymerizations of this invention will accordingly be conducted in the absence of significant quantities of halogens and halogen containing compounds.

The para-alkyl-substituted phenols which can be utilized generally have the structural formula:

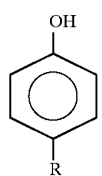

wherein R is an alkyl group which contains from about 6 to about 20 carbon atoms. Such para-alkyl-substituted phenols accordingly contain from about 12 to about 26 carbon atoms. In most cases, the alkyl group in the para-alkyl-substituted phenol will contain from about 8 to about 18 carbon atoms. Such para-alkyl-substituted phenols contain from about 14 to about 24 carbon atoms. It is typically preferred for the alkyl group in the para-alkyl-substituted phenol to contain from about 9 to about 14 carbon atoms. Such para-alkyl-substituted phenols contain from about 15 to about 20 carbon atoms. Exceptionally good results can be attained utilizing para-alkyl-substituted phenols having alkyl groups which contain 12 carbon atoms. These highly preferred para-alkyl-substituted phenols contain 18 carbon atoms. The polymerizations of this invention are initiated by charging the catalyst components into the polymerization medium.

The amount of cobalt (III) acetylacetonate utilized will typically be within the range of about 0.020 phm to about 0.075 phm (parts per hundred parts of 1,3-butadiene monomer). It is generally preferred for the cobalt (III) acetylacetonate to be employed at a level which is within the range of about 0.030 phm to about 0.065 phm. It is generally more preferred for the cobalt (III) acetylacetonate to be utilized in an amount within the range of about 0.045 phm to about 0.055 phm. In order to attain the level of solubility which is desired, it is important to utilize cobalt (III) acetylacetonate.

The organoaluminum compound will be employed in an amount sufficient to attain a molar ratio of the organoaluminum compound to the cobalt (III) acetylacetonate to be within the range of about 10:1 to about 50:1. It is typically preferred for the molar ratio of the organoaluminum compound to the cobalt (III) acetylacetonate to be within the range of about 12:1 to about 30:1. It is more preferred for the ratio of the organoaluminum compound to the cobalt (III) acetylacetonate to be within the range of about 16:1 to about 24:1.

It is critical in attaining the benefits of this invention for a portion of the para-alkyl-substituted phenol to be "premixed" with the cobalt (III) acetylacetonate prior to charging it into the polymerization medium. Normally, at least about 1 mole of the para-alkyl-substituted phenol will be premixed per mole of the cobalt (III) acetylacetonate. It is generally preferred for the molar ratio of para-substituted phenol to cobalt (III) acetylacetonate in the premix to be within the range of 2:1 to 37:1 with molar ratios within the range of 3:1 to 16:1 being most preferred. This can be accomplished by simply mixing the para-alkyl-substituted phenol with the cobalt (III) acetylacetonate prior to their introduction into the reaction zone. This will typically be accomplished by mixing the phenol with the cobalt (III) acetylacetonate in the presence of an organic solvent. This is because the organic solvent will reduce the viscosity of the mixture which makes it much easier to handle. Hexane is a highly preferred organic solvent for this purpose. In most cases, a sufficient amount of hexane will be added to make a solution which contains from about 1 weight percent to about 95 weight percent hexane, based upon the total weight of the para-alkyl-substituted phenol/cobalt (III) acetylacetonate/hexane solution. It is generally preferred for such solutions to contain from about 2 weight percent to about 20 weight percent hexane with it being most preferred for such solutions to contain from about 4 weight percent to about 10 weight percent hexane.

It is also critical to "prereact" a portion of the para-alkyl-substituted phenol with the organoaluminum compound prior to charging it into the polymerization medium. The balance of the para-alkyl-substituted phenol is prereacted with the cobalt (III) acetylacetonate. In other words, the portion of the para-substituted phenol which is not premixed with the cobalt (III) acetylacetonate is prereacted with the organoaluminum compound. The total molar ratio of para-alkyl-substituted phenol to the organoaluminum compound in the polymerization medium will be within the range of 2:1 to 3:1. It is preferred for a molar ratio of the para-alkyl-substituted phenol to the organoaluminum compound to be within the range of 2.3:1 to 2.8:1 with molar ratios within the range of about 2.5:1 to 2.6:1 being most preferred.

The molar ratio of the para-alkyl-substituted phenol to the cobalt (III) acetylacetonate will typically be within the range of about 1:1 to about 37:1. It is generally preferred for the molar ratio of the para-alkyl-substituted phenol to the cobalt (III) acetylacetonate to be within the range of about 1:1 to about 24:1. It is generally most preferred for the ratio of the para-alkyl-substituted phenol to the cobalt (III) acetylacetonate to be within the range of about 12:1 to about 16:1.

Carbon disulfide can be introduced into the polymerization medium as a separate component in cases where it is employed as a gel inhibitor or it can be premixed with the monomer and solvent prior to initiating the polymerization. In such cases, the molar ratio of the carbon disulfide to the cobalt will generally be within the range of about 0.05 to about 1. In any case, the carbon disulfide can be added "in situ" to the reaction zone by charging it separately from the other components. However, as has been explained, in most cases, it will not be necessary to add carbon disulfide to the polymerization as a gel inhibitor. In other words, the polymerizations of this invention will typically be carried out in the absence of carbon disulfide.

In the practice of this invention, it will not ordinarily be necessary to utilize a molecular weight regulator. Thus, the polymerizations of this invention will normally be conducted in the absence of molecular weight regulators. However, a dialkyl sulfoxide, a diaryl sulfoxide or a dialkaryl sulfoxide can optionally be included in the polymerization medium as a molecular weight regulator. The molecular weight of the TPBD produced naturally decreases with increasing levels of the sulfoxide molecular weight regulator present during the polymerization. In cases where a molecular weight regulator is utilized, the molar ratio of the sulfoxide molecular weight regulator to the cobalt compound will normally be within the range of about 0.05:1 to about 10:1.

The sulfoxides which can optionally be employed as molecular weight regulators can be dialkyl sulfoxides, diaryl sulfoxides or dialkaryl sulfoxides. These compounds have the general structural formula:

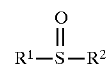

wherein $R^1$ and $R^2$ can be the same or different and are selected from alkyl groups, aryl groups and alkaryl groups. $R^1$ and $R^2$ generally contain from 1 to about 12 carbon atoms. $R^1$ and $R^2$ will more typically contain from 1 to about 6 carbon atoms.

Some representative examples of dialkyl sulfoxides which can be used include dimethyl sulfoxide (DMSO), diethyl sulfoxide, dipropyl sulfoxide and dibutyl sulfoxide. Diphenyl sulfoxide is an example of a diaryl sulfoxide which can be employed as the molecular weight regulator. Some representative examples of dialkaryl sulfoxides which can be utilized include di-3-phenylpropyl sulfoxide, di-phenylmethyl sulfoxide and di-para-methylphenyl sulfoxide.

In the TPBD produced by the process of this invention, at least about 65 percent of the butadiene repeat units in the polymer are of the trans-1,4-isomeric structure. The TPBD made utilizing the catalyst system of this invention typically has a trans-isomer content of at least about 70 percent. In most cases, the TPBD made by the process of this invention will have a trans-isomer content which is within the range of about 75 percent to about 87 percent.

The polymerizations of this invention result in the formation of solutions containing the TPBD. Standard techniques can be utilized to recover the TPBD from the solution in which it is dissolved. Coagulation techniques will typically be employed to recover the TPBD from the organic solvent. Such coagulation procedures typically involve the addition of an alcohol or ketone to the TPBD solution to induce coagulation. However, the TPBD can also be recovered from the organic solvent by evaporation procedures, such as steam-stripping. Such evaporation procedures typically involve heating the polymer solution to a slightly elevated temperature in conjunction with the application of vacuum.

The TPBD made utilizing the techniques of this invention is a thermoplastic resin. It can be molded into various useful articles. Because the TPBD contains many double bonds in its backbone, it can also be blended and cocured with rubbers. Despite the fact that TPBD of this invention is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics. By virtue of the fact that a low level of cobalt is present in the catalyst systems of this invention, the level of residual cobalt in the TPBD made by the process of this invention is greatly reduced. This significantly improves the thermal stability of the TPBD.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLES 1–20

In this series of experiments, TPBD was synthesized utilizing the techniques of this invention. In the procedure used, a cobalt catalyst solution was made by first adding cobalt (III) acetylacetonate (cobaltic acetylacetonate) to a make-up vessel followed by the addition of p-dodecylphenol (DP). The cobalt (III) acetylacetonate was obtained from The Shepherd Chemical Company and the p-dodecylphenol was obtained from Schenectady Chemicals. Then, about 30 percent of the hexanes was added and the make-up bottle was placed on a shaker. Dissolution was complete within a few minutes. Then, more hexanes was added to provide a final concentration of 0.05M cobalt.

Aluminum catalyst solutions were also made by mixing triethylaluminum with p-dodecylphenol in hexanes. Various ratios were used in the make-up, depending on the amount of p-dodecylphenol used in making up the cobalt salt solution.

Polymerizations were carried out by charging solutions containing 14.5 percent 1,3-butadiene in hexanes into 4-ounce (118 ml) polymerization bottles followed by the addition of the aluminum catalyst solution and the cobalt catalyst solution. In this series of experiments, the molar ratio of aluminum to cobalt was held constant at 24:1 and the cobalt level was held constant at 0.054 phm. The molar ratio of the p-dodecylphenol to the cobalt is reported in Table I. It should be noted that p-dodecylphenol was not included in the polymerizations of Examples 1–5.

During the polymerizations, the polymerization bottles were rotated end-over-end in a water bath which was maintained at a temperature of 65° C. After the desired polymerization time, a shortstop solution was added to give 1.0 phm of 2-propanol and 1.0 phm of an antioxidant. The TPBD was then isolated by air drying followed by drying in a vacuum oven. The polymer yields and dilute solution viscosities of the TPBD polymers made is reported in Table I.

TABLE I

| Example | DP:Co ratio | Yield | DSV (dl/g) |
|---|---|---|---|
| 1 | — | 23% | 2.88 |
| 2 | — | 52% | 4.07 |
| 3 | — | 68% | 4.35 |
| 4 | — | 81% | 4.59 |
| 5 | — | 97% | 4.75 |
| 6 | 3:1 | 34% | 2.75 |
| 7 | 3:1 | 57% | 3.23 |
| 8 | 3:1 | 68% | 3.30 |
| 9 | 3:1 | 79% | 3.64 |
| 10 | 3:1 | 96% | 3.62 |
| 11 | 14:1 | 32% | 1.79 |
| 12 | 14:1 | 48% | 1.98 |
| 13 | 14:1 | 59% | 2.15 |
| 14 | 14:1 | 64% | 2.24 |
| 15 | 14:1 | 84% | 2.34 |
| 16 | 37:1 | 32% | 1.6 |
| 17 | 37:1 | 46% | 1.77 |
| 18 | 37:1 | 51% | 1.84 |
| 19 | 37:1 | 68% | 2.18 |
| 20 | 37:1 | 89% | 2.32 |

COMPARATIVE EXAMPLES 21–25

In this series of experiments, the same procedure which was utilized in Examples 1–20 was repeated except for the fact that cobalt octanoate was substituted for the cobalt (III) acetylacetonate. The results of this series of experiments is reported in Table II.

TABLE II

| Example | DP:Co ratio | Yield | DSV (dl/g) |
|---|---|---|---|
| 21 | — | 31% | 4.77 |
| 22 | — | 56% | 5.80 |
| 23 | — | 72% | 6.31 |
| 24 | — | 81% | 6.52 |
| 25 | — | 95% | 7.01 |

As can be seen by reviewing the data in Table II, the molecular weights of TPBD synthesized in this series of experiments was much higher than the molecular weights of the TPBD made utilizing cobalt (III) acetylacetonate. This is exemplified by the fact that the dilute solution viscosities of the TPBD polymers made in this series of experiments is much higher. This series of experiments accordingly shows the criticality of employing cobalt (III) acetylacetonate in the catalyst system.

COMPARATIVE EXAMPLE 26

In this experiment, TPBD was synthesized utilizing a catalyst system like the one employed in Examples 1–20 except for the fact that cobalt octanoate was substituted for the cobalt (III) acetylacetonate and that the cobalt octanoate was not premixed with the p-dodecylphenol. Additionally, the level of cobalt octanoate was increased to 0.25 phm. Thus, the level of cobalt employed was about 5 times higher than the level of cobalt employed in Examples 1–20.

The polymer yield attained in this experiment was about 85 percent and the TPBD made was determined to have a dilute solution viscosity of 2.32 dl/g. Thus, the TPBD made in Example 20 had the same dilute solution viscosity as the polymer made in this experiment. However, it was synthesized using only about 22 percent as much cobalt in the catalyst system. Nevertheless, the polymer yield attained in Example 20, using the technique of this invention, was higher than the yield realized in this comparative experiment. Thus, this comparative experiment shows the enormous benefit which can be realized by utilizing the technique of this invention in the synthesis of TPBD.

While certain representative embodiments and details have been shown for the purpose of illustrating the present invention, it will be apparent to those skilled in this art that various changes and modifications can be made therein without departing from the scope of the present invention.

What is claimed is:

1. A process for synthesizing trans-1,4-polybutadiene by polymerizing 1,3-butadiene monomer in the presence of a catalyst system which is comprised of cobalt (III) acetylacetonate, an organoaluminum compound and a para-alkyl-substituted phenol, wherein the cobalt (III) acetylacetonate is mixed with a portion of the para-alkyl-substituted phenol prior to the polymerization and wherein the organoaluminum compound is mixed with the balance of the para-alkyl-substituted phenol prior to the polymerization.

2. A process for synthesizing trans-1,4-polybutadiene in a continuous process which comprises continuously charging 1,3-butadiene monomer, cobalt (III) acetylacetonate, an organoaluminum compound, a para-alkyl-substituted phenol and an organic solvent into a reaction zone, wherein the cobalt (III) acetylacetonate is mixed with a portion of the para-substituted phenol prior to being charged into the reaction zone; and wherein the organoaluminum compound is mixed with the balance of the para-alkyl-substituted phenol prior to being charged into the reaction zone, allowing the 1,3-butadiene monomer to polymerize in said reaction zone to form the trans-1,4-polybutadiene; and continuously withdrawing the trans-1,4-polybutadiene from said reaction zone.

3. A process as specified in claim 2 wherein the 1,3-butadiene monomer in the reaction zone is at a concentration which is within the range of about 5 percent to about 30 percent, based upon the total weight of the 1,3-butadiene monomer and organic solvent in the reaction zone; and wherein the temperature in the reaction zone is within the range of about 20° C. to about 125° C.

4. A process as specified in claim 3 wherein the molar ratio of the organoaluminum compound to the cobalt (III) acetylacetonate is within the range of about 10:1 to about 50:1.

5. A process as specified in claim 4 wherein the molar ratio of the para-alkyl-substituted phenol to the cobalt (III) acetylacetonate is within the range of about 1:1 to about 37:1.

6. A process as specified in claim 5 wherein the organoaluminum compound is selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum and diethyl benzyl aluminum.

7. A process as specified in claim 6 wherein the para-alkyl-substituted phenol has an alkyl group which contains from about 6 to about 20 carbon atoms.

8. A process as specified in claim 7 wherein the cobalt (III) mcetylacetonate is present in an amount which is within the range of about 0.020 phm to about 0.075 phm.

9. A process as specified in claim 8 wherein the cobalt (III) acetylacetonate is mixed with the para-substituted phenol and an organic solvent prior to being charged into the reaction zone.

10. A process as specified in claim 9 wherein the organic solvent is hexane.

11. A process as specified in claim 10 wherein the cobalt (III) acetylacetonate is mixed with the para-substituted phenol and the hexane prior to being charged into the reaction zone in amounts which yields a solution containing from about 1 weight percent to about 95 weight percent hexane, based upon the total weight of the para-alkyl-substituted phenol/cobalt (III) acetylacetonate/hexane solution.

12. A process as specified in claim 10 wherein the cobalt (III) acetylacetonate is mixed with the para-substituted phenol and the hexane prior to being charged into the reaction zone in amounts which yields a solution containing from about 2 weight percent to about 20 weight percent hexane, based upon the total weight of the para-alkyl-substituted phenol/cobalt (III) acetylacetonate/hexane solution.

13. A process as specified in claim 10 wherein the cobalt (III) acetylacetonate is mixed with the para-substituted phenol and the hexane prior to being charged into the reaction zone in amounts which yields a solution containing from about 4 weight percent to about 10 weight percent hexane, based upon the total weight of the para-alkyl-substituted phenol/cobalt (III) acetylacetonate/hexane solution.

14. A process as specified in claim 2 wherein said process is carried out in the absence of carbon disulfide.

15. A process as specified in claim 9 wherein the molar ratio of the organoaluminum compound to the cobalt (III) acetylacetonate is within the range of about 12:1 to about 30:1; wherein the molar ratio of the para-alkyl-substituted phenol to the cobalt (III) acetylacetonate is within the range of about 6:1 to about 24:1; and wherein the cobalt (III) acetylacetonate is present in an amount which is within the range of about 0.030 phm to about 0.065 phm.

16. A process as specified in claim 15 wherein the 1,3-butadiene monomer is polymerized at a temperature which is within the range of about 65° C. to about 95° C.;

wherein the 1,3-butadiene monomer in the reaction zone is at a concentration which is within the range of about 10 percent to about 25 percent, based upon the total weight of the 1,3-butadiene monomer and organic solvent in the reaction zone; and wherein the organoaluminum compound is selected from the group consisting of triethyl aluminum, tri-n-propyl aluminum, triisobutyl aluminum, trihexyl aluminum and diisobutyl aluminum hydride.

17. A process as specified in claim 16 wherein the para-alkyl-substituted phenol has an alkyl group which contains from about 9 to about 14 carbon atoms.

18. A process as specified in claim 17 wherein the molar ratio of the organoaluminum compound to the cobalt (III) acetylacetonate is within the range of about 16:1 to about 24:1; wherein the molar ratio of the para-alkyl-substituted phenol to the cobalt (III) acetylacetonate is within the range of about 12:1 to about 16:1; and wherein the cobalt (III) acetylacetonate is present in an amount which is within the range of about 0.045 phm to about 0.055 phm.

19. A process as specified in claim 18 wherein the 1,3-butadiene monomer in the reaction zone is at a concentration which is within the range of about 15 percent to about 20 percent, based upon the total weight of the 1,3-butadiene monomer and organic solvent in the reaction zone.

20. A process as specified in claim 19 wherein the para-alkyl-substituted phenol is para-dodecylphenol.

* * * * *